United States Patent
Tian et al.

(10) Patent No.: US 11,008,937 B2
(45) Date of Patent: May 18, 2021

(54) CRANK AND CONNECTING ROD MECHANISM WHICH CAN REALIZE MILLER CYCLE AND ITS CONTROL METHOD

(71) Applicant: XIHUA UNIVERSITY, Chengdu (CN)

(72) Inventors: Wei Tian, Chengdu (CN); Yunlu Chu, Chengdu (CN); Mingyan Hu, Chengdu (CN); Bang Xiao, Chengdu (CN); Xueshun Wu, Chengdu (CN); Zhiqiang Han, Chengdu (CN)

(73) Assignee: XIHUA UNIVERSITY, Chengdu (CN)

( * ) Notice: Subject to any disclaimer, the term of this patent is extended or adjusted under 35 U.S.C. 154(b) by 0 days.

(21) Appl. No.: 16/959,151

(22) PCT Filed: Jan. 2, 2019

(86) PCT No.: PCT/CN2019/070088
§ 371 (c)(1),
(2) Date: Jun. 30, 2020

(87) PCT Pub. No.: WO2019/137278
PCT Pub. Date: Jul. 18, 2019

(65) Prior Publication Data
US 2020/0340396 A1    Oct. 29, 2020

(30) Foreign Application Priority Data

Jan. 9, 2018    (CN) .......................... 201810019440.X (51) Int. Cl.
*F02B 75/04* (2006.01)
*F16C 3/28* (2006.01)
(Continued)

(52) U.S. Cl.
CPC .............. *F02B 75/048* (2013.01); *F16C 3/28* (2013.01); *F16F 15/283* (2013.01); *F16H 1/28* (2013.01)

(58) Field of Classification Search
CPC ........ F02B 75/048; F02B 75/04; F02B 41/04; F02B 2275/32; F16C 3/28; F16F 15/283; F16H 1/28; F02D 15/02
See application file for complete search history.

(56) References Cited

U.S. PATENT DOCUMENTS 3,686,972 A  *  8/1972  McWhorter .............. F16C 3/28
                                                   74/602
4,377,992 A      3/1983  Zeilinger et al.
(Continued)

FOREIGN PATENT DOCUMENTS

| CN | 101109321 A | 1/2008 |
| CN | 201027899 Y | 2/2008 |

(Continued)

*Primary Examiner* — Daniel D Yabut
(74) *Attorney, Agent, or Firm* — Bayramoglu Law Offices LLC (57) ABSTRACT

A crank and connecting rod mechanism which can realize a Miller cycle and its control method, wherein an interior of a crankshaft is provided with a drive oil channel and a lock-up oil channel. A connecting rod neck of the crankshaft is arranged with an eccentric connecting rod bearing. In a crankshaft balance weight, a drive gear meshing with an outer meshing gear ring of the eccentric connecting rod bearing through an idle gear is installed. A planetary gear is installed in a drive gear hollow shaft. A lockpin is designed for the drive gear hollow shaft so as to lock with the crankshaft balance weight or with a planetary gear shaft.

5 Claims, 4 Drawing Sheets

(51) Int. Cl.
*F16F 15/28* (2006.01)
*F16H 1/28* (2006.01)

(56) References Cited

U.S. PATENT DOCUMENTS

| | | | | |
|---|---|---|---|---|
| 5,908,014 | A * | 6/1999 | Leithinger | F02B 75/048 |
| | | | | 123/78 F |
| 5,927,236 | A * | 7/1999 | Gonzalez | F02B 75/048 |
| | | | | 123/78 F |
| 2008/0184966 | A1* | 8/2008 | Marchisseau | F02B 75/048 |
| | | | | 123/48 B |
| 2012/0160216 | A1* | 6/2012 | Klarer | F02B 41/04 |
| | | | | 123/48 B |
| 2018/0363547 | A1* | 12/2018 | Nakamura | F02B 75/048 |

FOREIGN PATENT DOCUMENTS

| | | | | |
|---|---|---|---|---|
| CN | 102330617 | A | 1/2012 | |
| CN | 101403342 | B | 6/2012 | |
| CN | 102953806 | A | 3/2013 | |
| CN | 104533636 | A | 4/2015 | |
| CN | 204253195 | U | 4/2015 | |
| CN | 106837587 | A | 6/2017 | |
| CN | 106930831 | A | 7/2017 | |
| CN | 108590849 | A | 9/2018 | |
| CN | 208010466 | U | 10/2018 | |
| DE | 102008032665 | A1 * | 1/2010 | ............. F02D 15/02 |
| JP | 58093935 | A * | 6/1983 | ............. F02B 41/04 |

* cited by examiner

CRANK AND CONNECTING ROD MECHANISM WHICH CAN REALIZE MILLER CYCLE AND ITS CONTROL METHOD

CROSS-REFERENCE TO THE RELATED APPLICATIONS

This application is the national stage entry of International Application No. PCT/CN2019/070088, filed on Jan. 2, 2019, which is based upon and claims priority to Chinese Patent Application No. 201810019440.X, filed on Jan. 9, 2018, the entire contents of which are incorporated herein by reference.

TECHNICAL FIELD

The invention involves the technical field of piston internal combustion engine, in particular a crank and connecting rod mechanism which can realize a Miller cycle and its control method.

BACKGROUND

The piston internal combustion engine is widely used as a power source in vehicles, non-road moving machinery, ships and some fixed generating sets, which makes important contributions to the development of the national economy. With the development of economy and industrial technology, the quantity of piston internal combustion engine continues to increase, which brings great pressure to the energy and environment. Therefore, energy conservation and emission reduction have always been the pursuit of the piston internal combustion engine workers.

Generally, the increase of the compression ratio of piston internal combustion engine can improve its fuel economy and emission level. However, when the engine has a relatively heavy load, the high compression ratio is likely to cause the engine knock, lead to the deteriorative engine noise and emissions, and even result in the mechanical damage to the engine. In order to solve this problem, the idea of a variable compression engine which can dynamically adjusts its compression ratio according to the state of the engine is proposed to optimize its performance.

At present, the available information shows that the variable compression engines are generally divided into the following categories: 1. The compression ratio of engine is changed with the change of the crankshaft position, e.g., Patent CN201210494582.4; 2. The compression ratio of engine is changed with the change of the piston shape, e.g., Patent CN201110253913.0; 3. The compression ratio is changed by changing the clearance volume through a device on the cylinder cover, e.g., Patent CN201710106970.3; 4. The compression ratio is changed by changing the relative position between connecting rod and crankshaft or by changing the length of the connecting rod, e.g., Patent CN200810067205.6, CN200710029634.X and CN201710229147.1. All of the above schemes can realize the change of the compression ratio. However, when the crankshaft position is changed, any device related to the crankshaft position must be redesigned such as the flywheel at the output end, which results in a very complex structure of the engine. The change of the piston shape makes it difficult to control the dynamic compression ratio. The scheme of changing the relative position of connecting rod and crankshaft is highly feasible (for example, the technical scheme proposed in Patent CN201710229147.1), but the control scheme of this patent uses a stepping motor and an external contact circuit. However, the response speed of stepping motor is difficult to control the synchronous variable compression ratio with the high rotation speed of the engine, and the increase of the stepping motor mass on the high-speed rotating crankshaft will also have a great impact on the dynamic balance of the crankshaft and other mechanical properties; meanwhile, the external contact circuit will also reduce its control reliability.

SUMMARY

In view of above problems, this invention aims to provide a crank and connecting rod mechanism with hydraulic-mechanical variable compression ratio; the mechanism can move synchronously with the rotation of the engine to achieve the dynamic adjustment of compression ratio, and furthermore to realize the compression ratio adjustment within one power stroke of the engine, so as realize the Miller cycle. The technical scheme is as follows:

A crank and connecting rod mechanism which can realize a Miller cycle, including the crankshaft, crankshaft support cover, fulcrum bearing, drive gear assembly, planetary gear assembly and lockpin;

The crankshaft said comprises a main journal, a connecting rod neck and a crankshaft balance weight mutually fixed and connected;

The main journal can be rotated, and is installed in the cylindrical bore formed by crankshaft support cover and fulcrum bearing; the inner wall of the cylindrical bore is provided with the circumferential inward recessed crankshaft support drive oil channel ring groove and crankshaft support lock-up oil channel ring groove; the fulcrum bearing is provided with a drive oil channel leading to the crankshaft support drive oil channel ring groove, and a lock-up oil channel leading to the crankshaft support lock-up oil channel ring groove;

The axes of connecting rod neck and main journal are staggered and parallel, with the eccentric cylindrical connecting rod bearing arranged in the outer sleeve; the axis between the inner cylinder and the outer cylinder of the eccentric connecting rod bearing is staggered and parallel, while the inner wall of eccentric connecting rod bearing and the connecting rod neck are coordinated with each other through clearance, and the outer wall and the large end of connecting rod are also coordinated mutually through clearance; the outer edge at one of its ends is provided with an outer meshing gear ring, which is coaxial with the inner cylinder;

The crankshaft balance weight and connecting rod neck are located on both sides of the main journal axis respectively; a drive gear hollow shaft mounting hole is arranged on the crankshaft balance block, whose axis is parallel to that of main journal; the inner wall of the drive gear hollow shaft mounting hole is provided with an circumferential inward recessed lock-up oil channel ring groove and drive oil channel ring groove; the groove bottom of the drive oil channel ring groove is uniformly arranged with several lockpin holes whose depth is along the radial direction;

The crankshaft above is also provided with a crankshaft lock-up oil channel connecting the crankshaft support lock-up oil channel ring groove and the lock-up oil channel ring groove, as well as a crankshaft drive oil channel connecting the crankshaft support drive oil channel ring groove and the drive oil channel ring groove;

The drive gear assembly comprises a drive gear hollow shaft and a coaxial drive gear fixed at one end of the drive gear hollow shaft; the drive gear hollow shaft can be rotated, and is installed in the drive gear hollow shaft mounting hole, whose side wall is provided with a number of lockup oil through holes corresponding to the lock-up oil channel ring groove and a number of pin holes corresponding to the drive oil channel ring groove; the drive gear engages with the outer meshing gear ring through an idle gear; the shaft of the idle gear is fixed on the crankshaft balance weight and is parallel to the main journal;

The planetary gear assembly comprises a planetary gear shaft installed in the drive gear hollow shaft and a coaxial planetary gear fixed at one end of the planetary gear shaft; the circumference of the planetary gear shaft corresponding to the lockup oil through holes is provided with the planetary gear shaft lock-up oil ring groove, and that corresponding to the pin hole is arranged with multiple drive pin holes; the planetary gear shaft is also provided with a planetary gear shaft lock-up oil channel leading from the planetary gear shaft lock-up oil ring groove to the drive pin hole; the planetary gear meshes with the inner meshing gear ring; the inner meshing gear ring is fixed on the plane formed by the crankshaft support cover and the fulcrum bearing, and is coaxial with the main journal.

The lockpin is arranged in the pin hole and can be moved into the lockpin hole or drive pin hole under the actuation of hydraulic oil; the length of the lockpin is equal to or slightly less than the wall thickness of the drive gear hollow shaft and is greater than the depth of the lockpin hole and the drive pin hole.

Additionally, the eccentric connecting rod bearing described is divided into the positively-biased half bearing and negatively-biased half bearing along the axis of the inner cylinder, and the subdivision section is neither parallel nor perpendicular to the direction of the eccentricity.

Furthermore, there are 6 lockpin holes, 8 pin holes, 6 drive pin holes and 8 lockpins.

A control method of the crank and connecting rod mechanism which can realize the Miller cycle, including:

When the piston of an engine cylinder is at a certain moment before the bottom dead center of the intake stroke, the compression ratio of this cylinder is controlled in the maximum state;

When the piston continues to move, the compression ratio is controlled from large to small, until it becomes the minimum at a certain moment behind the bottom dead center of the inlet stroke, and then keeps the compression ratio unchanged;

When the piston moves upward to a certain position before the top dead center of the compression stroke, the compression ratio is controlled gradually from small to large, until it becomes the maximum at a certain position behind the top dead center of the compression stroke, and then keeps the compression ratio unchanged;

When the piston continues to move to a certain moment before the bottom dead center of the power stroke, the compression ratio is controlled from large to small, until it becomes the minimum at a certain moment behind the bottom dead center of the power stroke, and then keeps the compression ratio unchanged;

When the piston moves upward to a certain position before the top dead center of the exhaust stroke, the compression ratio is controlled gradually from small to large, until it becomes the maximum at a certain position behind the top dead center of the compression stroke, and then keeps the compression ratio unchanged.

Additionally, the speed of changing the engine compression ratio is determined by total transmission ratio of the outer meshing gear ring of eccentric connecting rod bearing, idle gear, drive gear, planetary gear and inner meshing gear ring.

Furthermore, the time step of changing the compression ratio is determined by the number of lockpin holes, the number of pin holes, the number of drive pin holes, as well as the transmission ratio between the inner meshing gear ring and the planetary gear.

The beneficial effects of this invention are:

11) The invention can realize the change of the compression ratio by changing the eccentricity of the connecting rod bearing. The drive torque needed is small and the drive system can be simplified;

12) The subdivision section of the eccentric connecting rod bearing provided in the invention is neither parallel nor perpendicular to the direction of eccentricity, which avoids the force of the crankshaft and connecting rod acting on the gap under a certain compression ratio state, and ensures that the force of the crankshaft and connecting rod will not cause the damage to the eccentric connecting rod bearing in the full compression ratio range;

13) The gear drive is used as the drive force for changing the compression ratio in this invention, which is stable and reliable;

14) The drive force for changing the compression ratio in this invention comes from the rotation of the crankshaft, which simplifies the drive force system, 15) The drive force system for changing the compression ratio in this invention is designed completely symmetrically, and the mass of the drive force system itself can also be used as the mass of the balance weight to balance the asymmetry of the engine, which will not cause too much influence on the original crankshaft balance weight and will reduce the workload of crankshaft dynamic balance development;

16) The invention can easily convert the change speed of the engine compression ratio by changing the total transmission ratio of the outer meshing gear ring of eccentric connecting rod bearing, idle gear, drive gear, planetary gear and inner meshing gear ring.

17) The invention can easily change the control time step of the compression ratio to calculate as per crankshaft angle by changing the number of lockpin holes, the number of pin holes on the drive gear hollow shaft, the number of drive pin holes, as well as the transmission ratio between the inner meshing gear ring and the planetary gear;

18) The invention applies the mechanical-hydraulic control, with large control flexibility;

19) The invention can be extended to engines with any number of cylinders;

20) The invention can be used for engines of various structural forms such as in-line type and V-type.

BRIEF DESCRIPTION OF THE DRAWINGS

In the figures: 1—crankshaft support cover; 2—crankshaft; 3—fulcrum bearing; 4—eccentric connecting rod bearing; 5—inner meshing gear ring; 6—drive oil channel; 7—lock-up oil channel; 8—planetary gear assembly; 9—crankshaft balance block; 10—lockpin; 11—drive gear assembly; 12—idle gear; 13—main journal; 14—connecting rod neck; 15—outer meshing gear ring; a1—positively-biased half bearing; a2—gear ring of positively-biased half bearing; a3—negatively-biased half bearing; a4—gear ring of negatively-biased half bearing; a5—center of connecting rod bearing's inner circle; a6—center of connecting rod bearing's outer circle; b1—lockup oil through hole; b2—drive gear hollow shaft; b3—drive gear; b4—pin hole; c1—planetary gear shaft lock-up oil ring groove; c2—planetary gear shaft lock-up oil channel; c3—planetary gear; c4—planetary gear shaft; c5—drive pin hole; f0—lock-up oil channel ring groove; f1—drive oil channel ring groove; f2—lockpin hole; f3—crankshaft support drive oil channel ring groove; f4—crankshaft support lock-up oil channel ring groove; f5—crankshaft drive oil channel; f6—crankshaft lock-up oil channel; f—drive gear hollow shaft mounting hole; f20—center circle of lockpin hole; b40—center circle of pin hole; c50—center circle of drive pin hole.

DETAILED DESCRIPTION OF THE EMBODIMENTS

Figure 1:
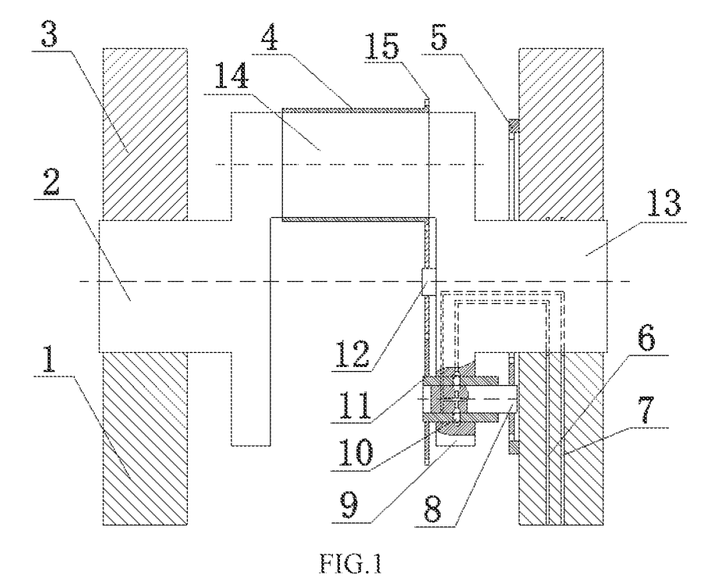
FIG. 1 is an overall structure profile diagram of the crank and connecting rod mechanism that can realize the Miller cycle.

The utility model is further explained in detail by combining the attached drawings and specific embodiments. FIG. 1 shows the crank and connecting rod mechanism that can realize the Miller cycle, including crankshaft 2, crankshaft support cover 1, fulcrum bearing 3, drive gear assembly 11, planetary gear assembly 8 and lockpin 10.

The fulcrum bearing 3 said is a part of the engine body, which is mainly used for the installation of crankshaft 2. The crankshaft support cover 1 is matched with the fulcrum bearing 3 to form the cylindrical bore. All cylindrical bores in an engine must remain coaxial.

The crankshaft 2 said comprises a main journal 13, a connecting rod neck 3 and a crankshaft balance weight 9 mutually fixed and connected.

The main journal 13 can be rotated, and is installed in the cylindrical bore formed by crankshaft support cover 1 and fulcrum bearing 3; the inner wall of the cylindrical bore is provided with the circumferential inward recessed crankshaft support drive oil channel ring groove f3 and crankshaft support lock-up oil channel ring groove f4; the fulcrum bearing 3 is provided with a drive oil channel 6 leading to the crankshaft support drive oil channel ring groove 3, and a lock-up oil channel 7 leading to the crankshaft support lock-up oil channel ring groove f4.

Figure 2:
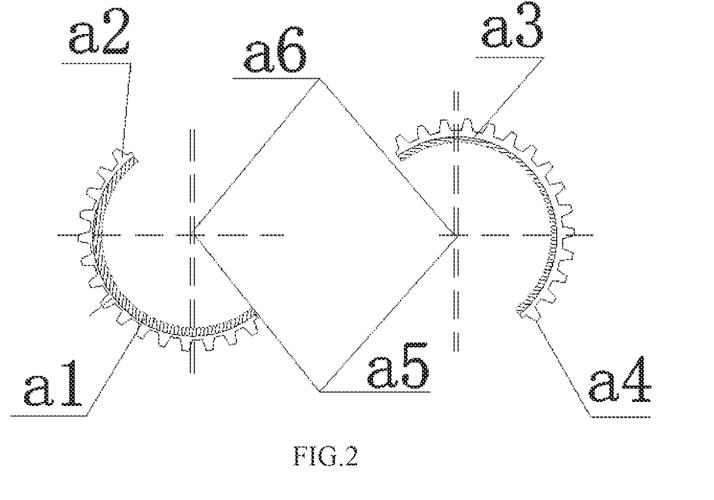
FIG. 2 shows the sectional view of the eccentric connecting rod bearing in the crank and connecting rod mechanism that can realize the Miller cycle.

The axes of connecting rod neck 3 and main journal 13 are staggered and parallel, with the eccentric cylindrical connecting rod bearing 4 arranged in the outer sleeve; the axis between the inner cylinder and the outer cylinder of the eccentric connecting rod bearing 4 is staggered and parallel, while the inner wall of eccentric connecting rod bearing 4 and the connecting rod neck 3 are coordinated with each other through clearance, the outer wall and the large end of connecting rod are also coordinated mutually through clearance; the outer edge at one of its ends is provided with an outer meshing gear ring 15, which is coaxial with the inner cylinder. As shown in FIG. 2, the eccentric connecting rod bearing 4 described is divided into the positively-biased half bearing a1 and negatively-biased half bearing a3 along the axis of the inner cylinder, and the positively-biased half bearing a1 and negatively-biased half bearing a3 match to form a complete eccentric connecting rod bearing. The subdivision section is neither parallel nor perpendicular to the direction of the eccentricity. The eccentric connecting rod bearing 4 can rotate freely between crankshaft connecting rod neck and large end of connecting rod, but cannot move in axial direction;

The crankshaft balance weight 9 and connecting rod neck 3 are located on both sides of the main journal 13 axis respectively; a drive gear hollow shaft mounting hole f is arranged on the crankshaft balance block 9, whose axis is parallel to that of main journal 13; the inner wall of the drive gear hollow shaft mounting hole f is provided with an circumferential inward recessed lock-up oil channel ring groove f and drive oil channel ring groove f1; the groove bottom of the drive oil channel ring groove f1 is uniformly arranged with several lockpin holes f2 whose depth is along the radial direction; the number of lockpin holes f2 are 6, which are uniformly processed on the circumference of the bottom of the drive oil channel ring groove ft. The axes of 6 lockpin holes f2 are in the same plane, which are also in the same plane with the drive oil channel ring groove f1, but the plane is perpendicular to the axis of the drive gear hollow shaft mounting hole.

Figure 3:
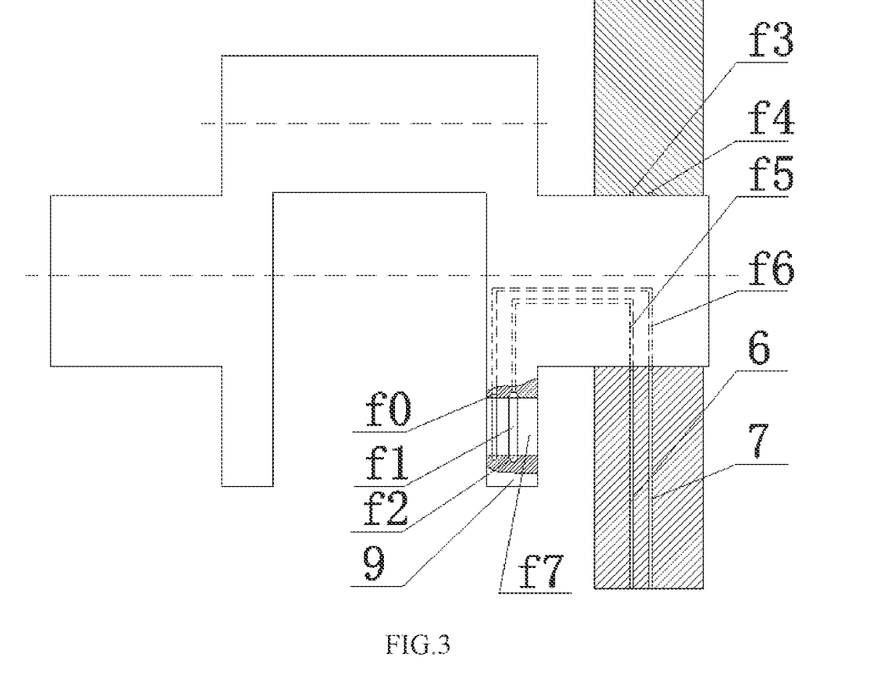
FIG. 3 is a schematic diagram of the crankshaft oil channel in the crank and connecting rod mechanism that can realize the Miller cycle.

As shown in FIG. 3, the crankshaft 2 above is also provided with a crankshaft lock-up oil channel f6 connecting the crankshaft support lock-up oil channel ring groove f4 and the lock-up oil channel ring groove f, as well as a crankshaft drive oil channel f5 connecting the crankshaft support drive oil channel ring groove 3 and the drive oil channel ring groove f1.

Figure 4:
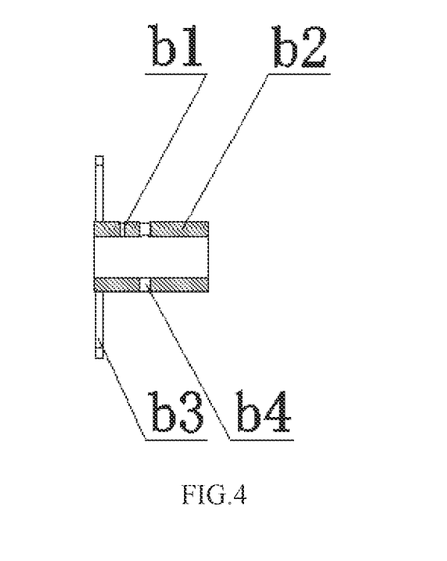
FIG. 4 shows the sectional view of the drive gear assembly in the crank and connecting rod mechanism that can realize the Miller cycle.

As shown in FIG. 4, the drive gear assembly 11 comprises a drive gear hollow shaft b2 and a coaxial drive gear b3 fixed at one end of the drive gear hollow shaft b2; the drive gear hollow shaft b2 can be rotated, and is installed in the drive gear hollow shaft mounting hole f7, whose side wall is provided with a number of lockup oil through holes b1 corresponding to the lock-up oil channel ring groove f0 and a number of pin holes b4 corresponding to the drive oil channel ring groove f1. Pinholes b4 are 8 through holes distributed on the same circumference of drive gear hollow shaft b2. The lockup oil through holes b1 and the pinholes b4 are not in the same plane, and both of them will not interfere with each other on the circumference. The said drive gear assembly 11 is installed in the drive gear hollow shaft mounting hole f7 of the said crankshaft balance weight 9 through the drive gear hollow shaft b2, and the drive gear hollow shaft b2 and the drive gear hollow shaft mounting hole f7 can rotate, but cannot move in the axial direction. After the drive gear assembly is installed, the drive gear b3 is in the same plane as the outer meshing gear ring of the eccentric connecting rod bearing 4, and the drive gear b3 engages with the outer meshing gear ring 15 through an idle gear 12; the shaft of the idle gear 12 is fixed on the crankshaft balance weight 9 and is parallel to the main journal 13; the drive gear b3, idle gear 12 and the outer meshing gear ring of the eccentric connecting rod bearing 4 engage in pairs in proper order.

Figure 5:
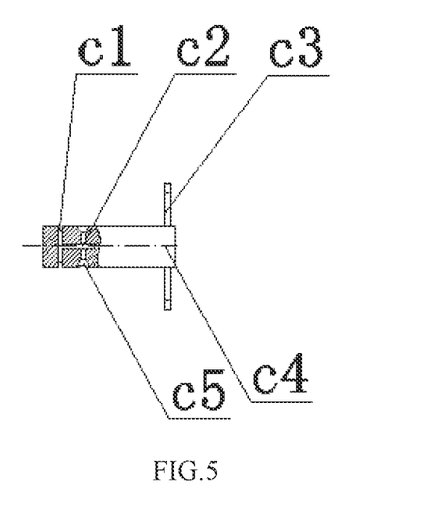
FIG. 5 shows the sectional view of the planetary gear assembly in the crank and connecting rod mechanism that can realize the Miller cycle.

As shown in FIG. 5, the planetary gear assembly 8 comprises a planetary gear shaft c4 installed in the drive gear hollow shaft b2 and a coaxial planetary gear c3 fixed at one end of the planetary gear shaft c4; the said planetary gear assembly is installed in the drive gear hollow shaft b2 through the planetary gear shaft c4. After the installation, the planetary gear shaft c4 can rotate but cannot move axially in the drive gear hollow shaft b2. The circumference of the planetary gear shaft c4 corresponding to the lockup oil through holes b1 is provided with the planetary gear shaft lock-up oil ring groove c1, and that corresponding to the pin hole b4 is arranged with multiple drive pin holes c5; the number of drive pin holes c5 is 6 and evenly distributed on the planetary gear shaft. The planetary gear shaft c4 is also provided with a planetary gear shaft lock-up oil channel c2 leading from the planetary gear shaft lock-up oil ring groove c1 to the drive pin hole c5; the planetary gear shaft lock-up oil channel c2 is a closed oil channel, and both ends are respectively connected to the drive pin hole c5 and the planetary gear shaft lock-up oil ring groove c1. The planetary gear c3 meshes with the inner meshing gear ring 5; the inner meshing gear ring 5 is fixed on the plane formed by the crankshaft support cover 1 and the fulcrum bearing 3, and is coaxial with the main journal 13.

There are 8 lockpins 10, which are arranged in the pin hole b4 and can be moved into the lockpin hole f2 or drive pin hole c5 under the actuation of hydraulic oil; the length of the lockpin 10 is equal to or slightly less than the wall thickness of the drive gear hollow shaft b2 and is greater than the depth of the lockpin hole f2 and the drive pin hole c5. The lockpin 10 can move in the drive gear hollow shaft pin hole b4 and the crankshaft balance weight lock pin hole f2, and can also move in the drive gear hollow shaft pin hole b4 and the planetary gear shaft drive pin hole c5.

Figure 6:
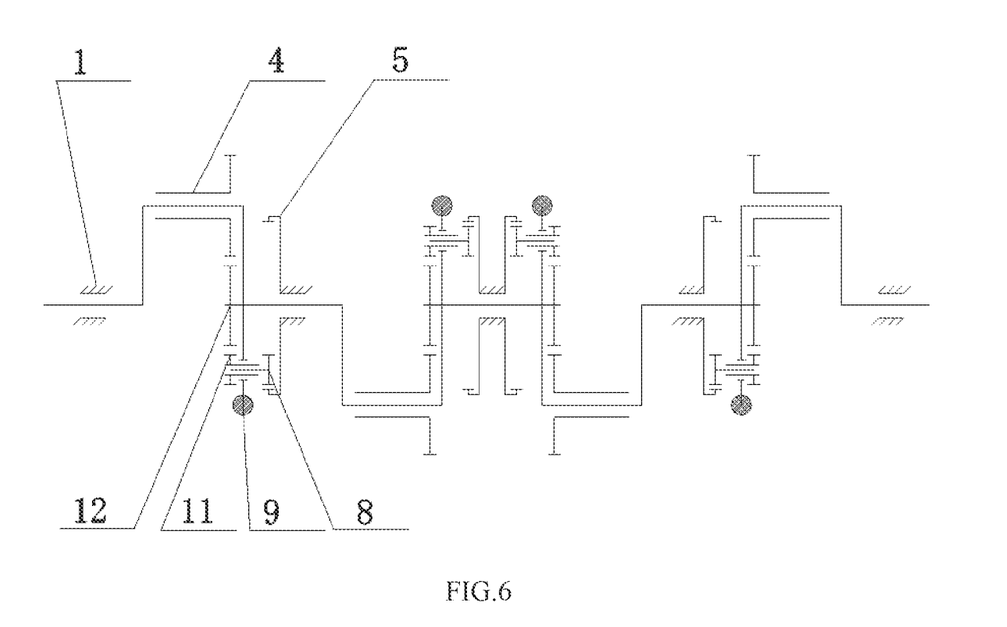
FIG. 6 shows the layout of the four-cylinder machine.

Each cylinder is provided with one set of the crank and connecting rod mechanism with hydraulic-mechanical variable compression ratio. FIG. 6 shows the layout of the four-cylinder machine.

In the process of engine operation, the control to the crank and connecting rod mechanism with hydraulic-mechanical variable compression ratio is realized as follows:

When the compression ratio keeps unchanged, the external oil pressure fills the hydraulic oil into the crankshaft support lock-up oil channel ring groove f4 processed onto the crankshaft support cover 1 and fulcrum bearing 4 through the lock-up oil channel 7, and then enters into the lock-up oil channel ring groove f0 on the crankshaft balance weight 9 through the crankshaft lock-up oil channel f6 processed onto the crankshaft 2. The hydraulic oil in the lock-up oil channel ring groove f0 on the crankshaft balance weight 9 flows into the planetary gear shaft lock-up oil ring groove c1 on the planetary gear shaft c4 through the lockup oil through holes b1 on the drive gear hollow shaft b2; then, enters into the drive pin hole c5 on the planetary gear shaft c4 through the planetary gear shaft lock-up oil channel c2, to push the lockpin 10 out of the drive pin hole c5. The lockpin 10, after pushed out, either stays in the pin hole b4 of the drive gear hollow shaft b2, or keeps between the pin hole b4 of the drive gear hollow shaft b2 and the lockpin hole f2 of the crankshaft balance weight 9, so as to lock the drive gear hollow shaft b2 and the crankshaft balance weight 9 together. When the drive gear hollow shaft b2 and the crankshaft balance weight 9 are locked together, the drive gear b3 moves synchronously with the crankshaft balance weight 9, the planetary gear c3 rotates in the inner meshing gear ring 5 with the crankshaft balance weight 9, the planetary gear shaft c3 rotates in the drive gear hollow shaft b2, and the idle gear 12 and the outer meshing gear ring of eccentric connecting rod will not rotate. The position relationship between eccentric connecting rod bearing 4 and crankshaft connecting rod neck keeps unchanged, so as to ensure that the compression ratio is invariable.

When the compression ratio is required to be changed, the external oil pressure fills the hydraulic oil into the crankshaft support drive oil channel ring groove f3 processed onto the crankshaft support cover 1 and fulcrum bearing 3 through the drive oil channel 6, and then enters into the drive oil channel ring groove f1 on the crankshaft balance weight 9 through the crankshaft drive oil channel f5 processed onto the crankshaft. The lockpin 10 in the lockpin hole f2 of the drive oil channel ring groove f1 on the crankshaft balance weight 9 is pushed out by hydraulic oil. The lockpin 10, after pushed out, either stays in the pin hole b4 of the drive gear hollow shaft b2, or keeps between the pin hole b4 of the drive gear hollow shaft b2 and the drive pin hole c5 of the planetary gear shaft c4, so as to lock the drive gear hollow shaft b2 and the planetary gear shaft c4 together. The planetary gear c3 rotates in the inner meshing gear ring 5 with the crankshaft balance weight 9. When the drive gear hollow shaft b2 and the planetary gear shaft c4 are locked together, the planetary gear shaft c4 moves synchronously with the drive gear hollow shaft b2; thus, the planetary gear shaft c4 will transmit the motion to the drive gear b3, then to the outer meshing gear ring of eccentric connecting rod through idle gear 12, and the eccentric connecting rod bearing 4 rotates around the crankshaft connecting rod neck, so as to change the compression ratio of the engine; the compression ratio of the engine becomes larger when the negatively-biased half bearing a3 is shifted to the positively-biased half bearing a1 at the outer end of the connecting rod neck, which becomes smaller when the positively-biased half bearing a1 is shifted to the negatively-biased half bearing a3.

In order to realize the Miller cycle, the control of the said crank and connecting rod mechanism with hydraulic-mechanical variable compression ratio is achieved in the following way during the operation of the engine:

When the piston of an engine cylinder is at a certain moment before the bottom dead center of the intake stroke, the compression ratio of this cylinder is controlled in the maximum state; when the piston continues to move, the compression ratio is controlled from large to small, until it becomes the minimum at a certain moment behind the bottom dead center of the inlet stroke, and then keeps the compression ratio unchanged; when the piston moves upward to a certain position before the top dead center of the compression stroke, the compression ratio is controlled gradually from small to large, until it becomes the maximum at a certain position behind the top dead center of the compression stroke, and then keeps the compression ratio unchanged; when the piston continues to move to a certain moment before the bottom dead center of the power stroke, the compression ratio is controlled from large to small, until it becomes the minimum at a certain moment behind the bottom dead center of the power stroke, and then keeps the compression ratio unchanged; when the piston moves upward to a certain position before the top dead center of the exhaust stroke, the compression ratio is controlled gradually from small to large, until it becomes the maximum at a certain position behind the top dead center of the compression stroke, and then keeps the compression ratio unchanged. The engine then enters the next intake stroke, so that the cycle can be repeated continuously.

Figure 7:
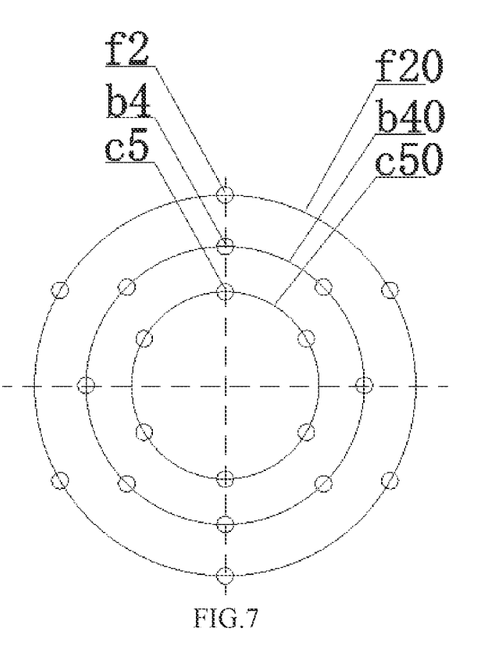
FIG. 7 is a control diagram of the invention.

Such control method allows the engine's intake compression ratio to be smaller than the work expansion ratio, and finally to achieve the Miller cycle. The moment of changing the compression ratio can be flexibly controlled according to the needs of the engine. The speed of changing the engine's compression ratio is determined by total transmission ratio of the outer meshing gear ring of eccentric connecting rod bearing, idle gear, drive gear, planetary gear and inner meshing gear ring, the time step of changing the compression ratio is calculated as per crankshaft angle and determined by the number of lockpin holes, the number of pin holes on the drive gear hollow shaft, the number of drive pin holes, as well as the transmission ratio between the inner meshing gear ring and the planetary gear. FIG. 7 is a control diagram.

The speed of changing the engine's compression ratio depends largely on the transmission ratio, for example, when the total transmission ratio from the inner meshing gear ring to the outer meshing gear is 1:1, that is to say, the crankshaft rotates for one circle, as long as it has always been under the transmission state, the engine's compression ratio can be continuously changed from the maximum to the minimum and then to the maximum again, if the total transmission ratio is 2:1, it means two circles, then the change speed will be twice the speed.

The time step of changing the compression ratio is determined mainly by the number of lockpin holes, the number of pin holes on the drive gear hollow shaft, and the number of drive pin holes. In this embodiment, 6 lockpin holes, 8 pin holes on the drive gear hollow shaft, and 6 drive pin holes are provided. 15 degrees crankshaft angle (CA). If the total transmission ratio is 1:1, the state can be changed every 15 degrees, and if it is 2:1, the state can be changed every 7.5 degrees. The number arrangement of "686" mentioned above is a more optimized combination mode. Other combinations can also be accepted. Any number that can be uniformly distributed within 360 degrees can be available, and the state can be changed as long as the hole positions are corresponding to each other. For example, the lockup state can be achieved as long as the positions of lockpin hole and the hollow shaft pin hole are corresponding to each other, the drive state can be realized as long as the drive pin hole is corresponding to the hollow shaft pin hole.

What is claimed is:

1. A crank and connecting rod mechanism which can realize a Miller cycle, comprising: a crankshaft, a crankshaft support cover, a fulcrum bearing, a drive gear assembly, a planetary gear assembly and a lockpin;
    the crankshaft comprises a main journal, a connecting rod neck and a crankshaft balance weight mutually fixed and connected;
    a drive gear hollow shaft mounting hole is arranged on the crankshaft balance weight, wherein an inner wall of the drive gear hollow shaft mounting hole is provided with a circumferential inward recessed lock-up oil channel ring groove and a drive oil channel ring groove, a groove bottom of the drive oil channel ring groove is uniformly arranged with a plurality of lockpin holes, wherein a depth of the plurality of lockpin holes is along a radial direction;
    the crankshaft is further provided with a crankshaft lock-up oil channel connecting the crankshaft lock-up oil channel ring groove and the circumferential inward recessed lock-up oil channel ring groove, as well as a crankshaft drive oil channel connecting a crankshaft support drive oil channel ring groove and the drive oil channel ring groove; and
    the drive gear assembly comprises a drive gear hollow shaft and a coaxial drive gear fixed at one end of the drive gear hollow shaft; the drive gear hollow shaft is capable of rotating, and is installed in the drive gear hollow shaft mounting hole, wherein a side wall of the drive gear hollow shaft mounting hole is provided with a plurality of lockup oil through holes corresponding to the circumferential inward recessed lock-up oil channel ring groove and a plurality of pin holes corresponding to the drive oil channel ring groove; the coaxial drive gear engages with an outer meshing gear ring through an idle gear; a shaft of the idle gear is fixed on the crankshaft balance weight and is parallel to the main journal;
    a planetary gar assembly comprising a planetary gear shaft installed in the drive gear hollow shaft and a coaxial planetary gear fixed at one end of the planetary gear shaft; a circumference of the planetary gear shaft corresponding to the plurality of lockup oil through holes is provided with a planetary gear shaft lock-up oil ring groove, and the planetary gear shaft lock-up oil ring groove corresponding to a pin hole of the plurality of pin holes is arranged with a plurality of drive pin holes; the planetary gear shaft is further provided with a planetary gear shaft lock-up oil channel leading from the planetary gear shaft lock-up oil ring groove to a drive pin hole of the plurality of drive pin holes; the coaxial planetary gear meshes with an inner meshing gear ring; the inner meshing gear ring is fixed on a plane formed by the crankshaft support cover and the fulcrum bearing, and is coaxial with the main journal;
    the lockpin is arranged in the pin hole of the plurality of pin holes and the lockpin is capable of moving into a lockpin hole of the plurality of lockpin holes or the drive pin hole of the plurality of drive pin holes under an actuation of hydraulic oil; a length of the lockpin is equal to or less than a wall thickness of the drive gear hollow shaft and is greater than a depth of the lockpin hole of the plurality of lockpin holes and the drive pin hole of the plurality of drive pin holes.

2. The crank and connecting rod mechanism which can realize the Miller cycle according to claim 1, further comprising six lockpin holes, eight pin holes, six drive pin holes and eight lockpins.

3. A control method of the crank and connecting rod mechanism which can realize the Miller cycle according to claim 1, wherein,
    when a piston of an engine cylinder is at a moment before a bottom dead center of an intake stroke, a compression ratio of the engine cylinder is controlled in a maximum state;
    when the piston of the engine cylinder continues to move, the compression ratio of the engine cylinder is controlled from large to small, until the compression ratio of the engine cylinder becomes minimum at the moment behind the bottom dead center of the intake stroke, and then keeps the compression ratio unchanged;
    when the piston of the engine cylinder moves upward to a position before a top dead center of a compression stroke, the compression ratio of the engine cylinder is controlled from small to large, until the compression ratio of the engine cylinder becomes maximum at the position behind the top dead center of the compression stroke, and then keeps the compression ratio unchanged;
    when the piston of the engine cylinder continues to move to a certain moment before a bottom dead center of a power stroke, the compression ratio of the engine cylinder is controlled from large to small, until the compression ratio of the engine cylinder becomes minimum at the moment behind the bottom dead center of the power stroke, and then keeps the compression ratio unchanged;

when the piston of the engine cylinder moves upward to a position before a top dead center of an exhaust stroke, the compression ratio of the engine cylinder is controlled from small to large, until the compression ratio of the engine cylinder becomes maximum at the position behind the top dead center of a compression stroke, and then keeps the compression ratio unchanged.

4. The control method of claim 3, wherein a speed of changing the compression ratio of the engine cylinder is determined by a total transmission ratio of the outer meshing gear ring of an eccentric cylindrical connecting rod bearing, the idle gear, the coaxial drive gear, the coaxial planetary gear and the inner meshing gear ring.

5. The control method of claim 3, wherein a time step of changing the compression ratio of the engine cylinder is determined by a number of the plurality of lockpin holes, a number of the plurality of pin holes, a number of the plurality of drive pin holes and a transmission ratio between the inner meshing gear ring and the coaxial planetary gear.

* * * * *